US009738503B2

(12) United States Patent
Benatti

(10) Patent No.: US 9,738,503 B2
(45) Date of Patent: Aug. 22, 2017

(54) PERFORATION DEVICE TO PERFORATE CLOSED RECEPTACLES CONTAINING COLORING PRODUCTS

(71) Applicant: COROB S.P.A. CON SOCIO UNICO, San Felice Sul Panaro (IT)

(72) Inventor: Fabrizio Benatti, Cavezzo (IT)

(73) Assignee: Corob S.p.A. Con Socio Unico, San Felice Sul Panaro (IT)

( * ) Notice: Subject to any disclaimer, the term of this patent is extended or adjusted under 35 U.S.C. 154(b) by 443 days.

(21) Appl. No.: 14/381,962

(22) PCT Filed: Feb. 27, 2013

(86) PCT No.: PCT/IB2013/000337
§ 371 (c)(1),
(2) Date: Aug. 28, 2014

(87) PCT Pub. No.: WO2013/128269
PCT Pub. Date: Sep. 6, 2013

(65) Prior Publication Data
US 2015/0026989 A1 Jan. 29, 2015

(30) Foreign Application Priority Data
Feb. 28, 2012 (IT) .............................. UD2012A0032

(51) Int. Cl.
B67B 7/48 (2006.01)
B65B 69/00 (2006.01)
(Continued)

(52) U.S. Cl.
CPC ............ *B67B 7/24* (2013.01); *B65B 69/0041* (2013.01); *F16P 3/18* (2013.01)

(58) Field of Classification Search
CPC ...... B67B 7/24; F16P 3/18; F16P 3/24; B65B 57/005; B65B 69/0041; B30B 1/04
(Continued)

(56) References Cited

U.S. PATENT DOCUMENTS 1,085,529 A * 1/1914 Blumberg ................. F16P 3/18
192/131 H
2,207,297 A * 7/1940 Lynch ....................... F16P 3/24
192/131 H
(Continued)

FOREIGN PATENT DOCUMENTS

DE 9115379 U1 * 3/1992 ............... F16P 3/24
FR 1589435 3/1970
(Continued)

OTHER PUBLICATIONS

PCT Search Report and Written Opinion from PCT/IB2013/000337 6 pages (Apr. 7, 2013).

*Primary Examiner* — Stephen F Gerrity
(74) *Attorney, Agent, or Firm* — Flaster/Greenberg P.C.

(57) ABSTRACT

A perforation device to perforate closed receptacles containing coloring products is provided, and includes a support plane which is configured to support a receptacle to be perforated. The support plane is movable in a substantially vertical direction. The perforation device also includes a perforation member positioned at a determinate height, higher than the support plane, and an actuator to selectively move the support plane toward the perforation member to cause the perforation of the receptacle to be perforated. The actuator includes a lifting mechanism connected to the support plane and drivable by a pedal that cannot be driven by an operator without the operator also driving a safety mechanism at the same time using both hands.

13 Claims, 8 Drawing Sheets

(51) Int. Cl.
  *B67B 7/00* (2006.01)
  *F16P 3/18* (2006.01)

(58) Field of Classification Search
  USPC ............... 53/77, 381.1, 381.2; 30/443, 448;
       100/344; 192/131 R, 131 H
  IPC ....................................................... B67B 7/48
  See application file for complete search history.

(56) References Cited

U.S. PATENT DOCUMENTS

| | | | | |
|---|---|---|---|---|
| 2,350,540 A | * | 6/1944 | Spiller et al. ............. | F16P 3/18 83/381 |
| 2,520,068 A | * | 8/1950 | Seiler ........................ | B67B 7/24 53/381.2 |
| 2,525,865 A | * | 10/1950 | Chisolm et al. .......... | F16P 3/18 192/131 H |
| 2,677,881 A | * | 5/1954 | Anderson ................. | B67B 7/30 30/448 |
| 2,733,799 A | * | 2/1956 | Williams .................. | F16P 3/18 192/131 H |
| 3,105,433 A | * | 10/1963 | Yerex et al. ......... | A22C 7/0023 100/344 |
| 3,821,850 A | * | 7/1974 | Kowalyk .................. | B67B 7/38 30/444 |
| 4,335,759 A | * | 6/1982 | Pattiniemi et al. . | B01F 13/1058 141/329 |
| 4,570,777 A | * | 2/1986 | Armstrong ................ | F16P 3/18 192/131 R |
| 5,784,854 A | | 7/1998 | Mazzalveri | |
| 6,240,559 B1 | | 6/2001 | Cares | |

FOREIGN PATENT DOCUMENTS

GB   2 048 825 A   12/1980
IT       1279712   12/1997

* cited by examiner

PERFORATION DEVICE TO PERFORATE CLOSED RECEPTACLES CONTAINING COLORING PRODUCTS

BACKGROUND OF THE INVENTION

Field of the Invention

The present invention concerns a mechanical perforation device, able to be selectively actuated by means of a pedal, so as to perforate, one at a time, closed receptacles, such as for example metal containers, of any shape and size, containing coloring products, such as coloring liquids or powders, bases for paints, varnishes, enamels, inks or similar products. The device according to the present invention is applied particularly in dispensing machines, or dispensers, of coloring products, able to introduce a dosed quantity of coloring pigments into a receptacle containing a paint base, to obtain the desired coloring product.

Description of Related Art

Machines are known for dispensing coloring products, such as for example pigments, into a receptacle that contains a fluid paint base, to obtain in this way a coloring product with a desired shade. One of such machines is described in the Italian patent of industrial invention n. 1.279.712, granted to the present Applicant on 16 Dec. 1997. In the machine described therein the receptacle is disposed on a support plane, able to be lifted vertically by means of an electric motor controlled by a computerized control unit. The support plane on which the receptacle to be perforated and containing the paint base is positioned is lifted toward a shaped punch disposed at a determinate height, until the latter perforates the upper wall of the receptacle. The support plane is then taken to a delivery position, lower than the perforation position, and kept in the position reached until the step of delivering the colored pigments is complete, through one or more delivery nozzles.

In the known machine described above, the perforation device of the receptacle is therefore commanded electrically, with all the disadvantages deriving therefrom, including the production and functioning costs, in addition to the fact that it is impossible to use when there is no electric energy.

Document GB-A-2.048.825 describes a perforation device for containers that shows the characteristics of the preamble of the main claim.

Purpose of the present invention is to obtain a device to perforate closed receptacles, for example metal, and containing coloring products, which is simple, economical to construct and reliable, and which has no running costs.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claim, while the dependent claims describe other characteristics of the invention or variants to the main inventive idea.

In accordance with the above purpose, a perforation device according to the present invention, for perforating closed receptacles containing coloring products, comprises a support plane movable in a substantially vertical direction and on which a receptacle to be perforated is suitable to be disposed, a perforation member disposed at a determinate height, higher than the support plane, and actuation means to selectively move the latter toward the perforation member to cause the perforation of the receptacle to be perforated. The perforation member may comprise, for example, any punch provided with shaped blades.

According to a main characteristic of the present invention, the actuation means comprise a lifting mechanism connected to the support plane and drivable by means of a pedal.

According to a secondary characteristic of the present invention, the lifting mechanism comprises a cable having a first end attached to the pedal and a second end attached to a plate able to slide vertically, on which the support plane is mounted, so that the actuation of the pedal by an operator lifts both the plate and the support plane toward the perforation member.

According to another secondary characteristic of the present invention, the plate is able to slide with respect to a vertical frame, on which a fixed pulley is mounted rotatable, on which the cable is disposed.

According to another secondary characteristic of the present invention, the frame comprises two uprights disposed on opposite sides with respect to the plate and on which the support plane is able to slide vertically.

Advantageously, the support plane can also be positioned at different heights with respect to the plate, using vertical positioning means, in order to be selectively positioned at a determinate distance from the perforation member, depending on the height of the receptacle to be perforated.

According to another secondary characteristic of the present invention, a safety mechanism is provided to be manually driven, so that the pedal cannot be driven by the operator without the latter also driving the safety mechanism at the same time and with both hands.

Advantageously, the safety mechanism comprises two hooks normally held attached to the plate by elastic means to hold the plate normally clamped in a lowered position. Furthermore, each of the hooks is mechanically connected to a release element which can be actuated manually, for example by means of a cable.

In this way, with the device according to the present invention, an operator can first position the support plane at a desired height, that is, a desired distance from the perforation member, depending on the height of the receptacle to be perforated, making the support plane slide with respect to the actuation means, and then, after actuating the safety mechanism, drive the pedal and perform the perforation proper; all this in total safety, with no cost whatsoever and without needing to have available any source of energy other than the physical energy supplied by the operator himself.

BRIEF DESCRIPTION OF THE SEVERAL VIEWS OF THE DRAWINGS

These and other characteristics of the present invention will become apparent from the following description of a preferential form of embodiment, given as a non-restrictive example with reference to the attached drawings wherein.

DETAILED DESCRIPTION OF THE INVENTION

Figure 1:
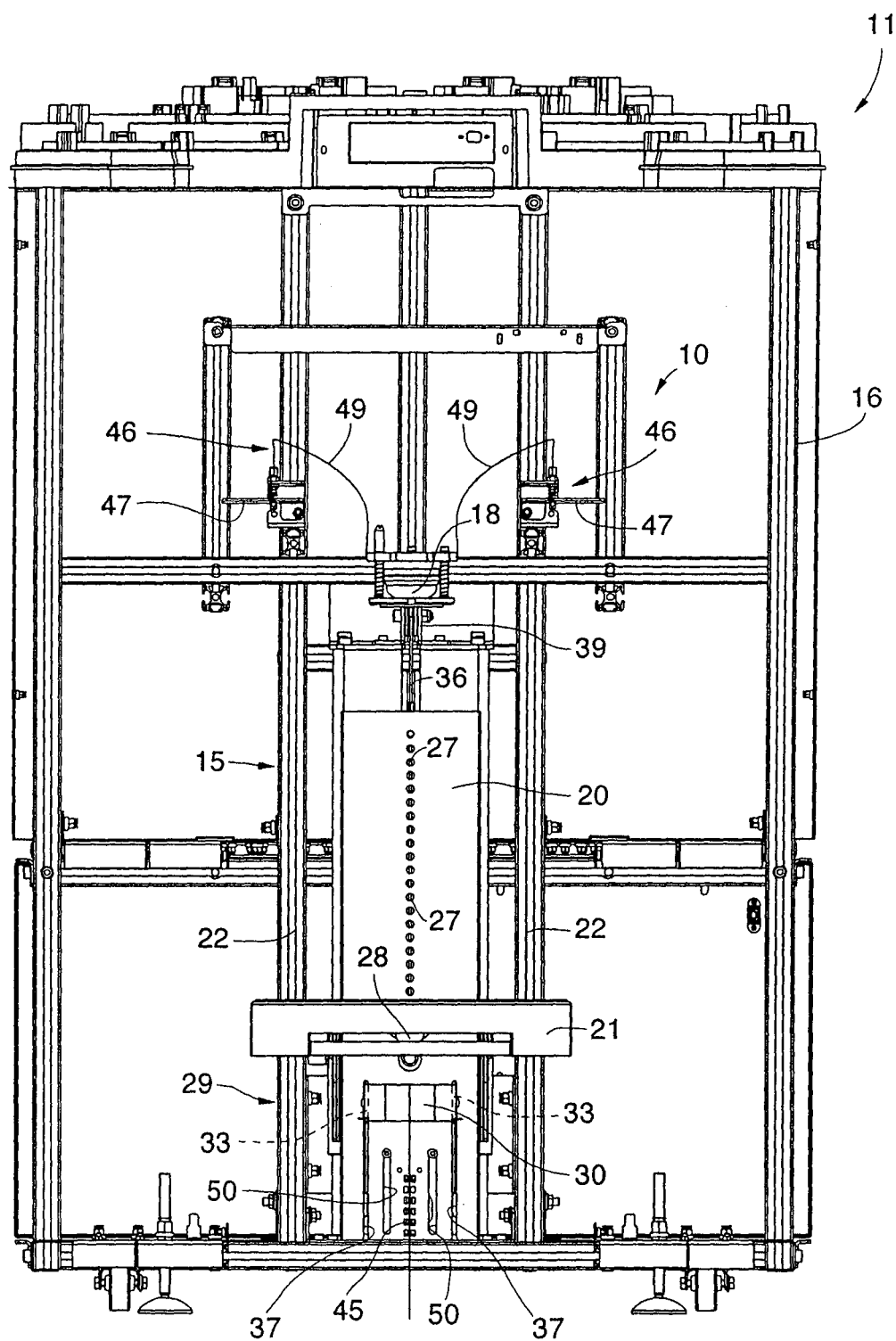
FIG. 1 is a front and schematized view of a perforation device according to the present invention, installed on a machine for dispensing coloring products and in the inactive position.
Figure 2:
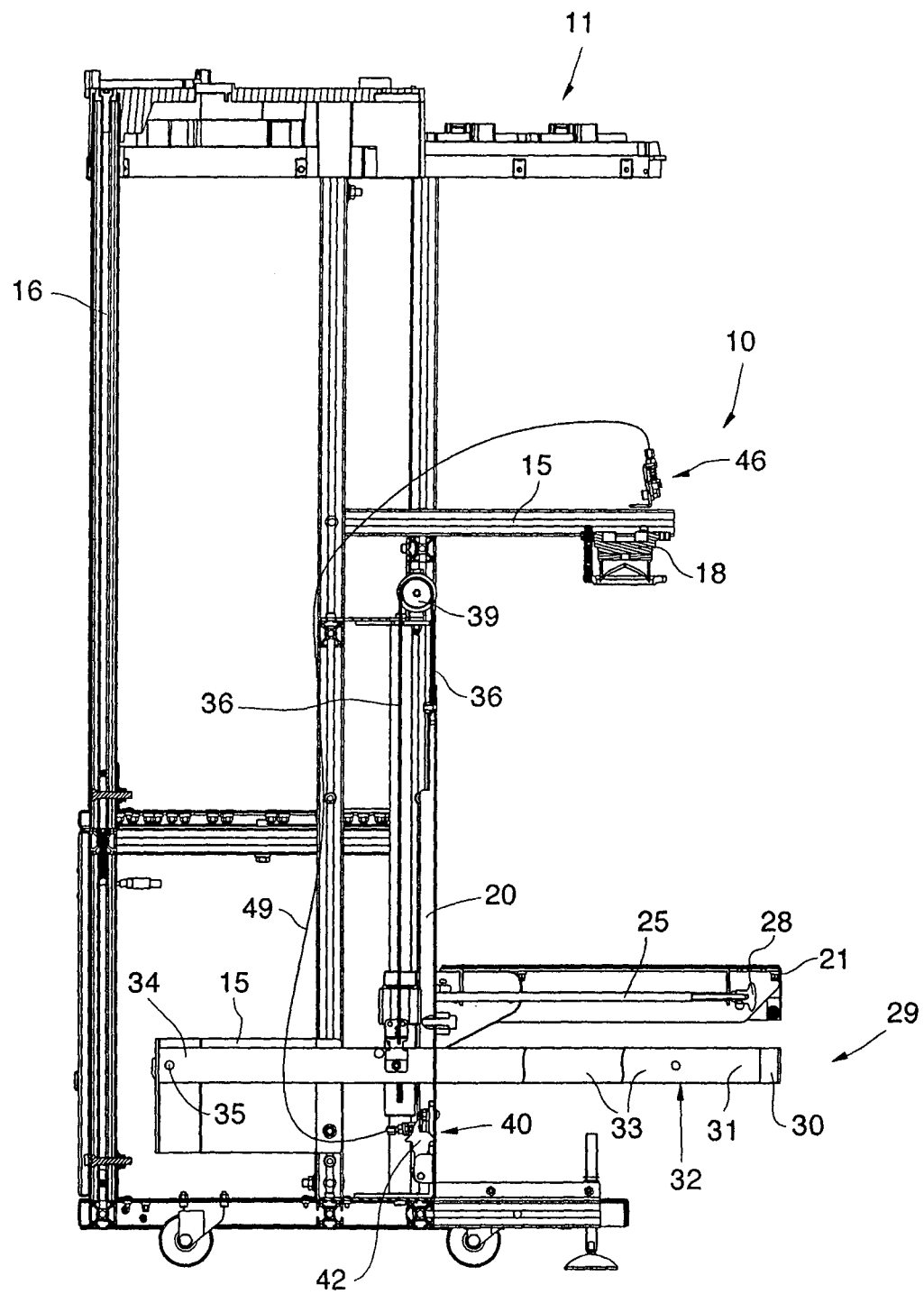
FIG. 2 is a lateral and schematized view of the perforation device in FIG. 1.
Figure 3:
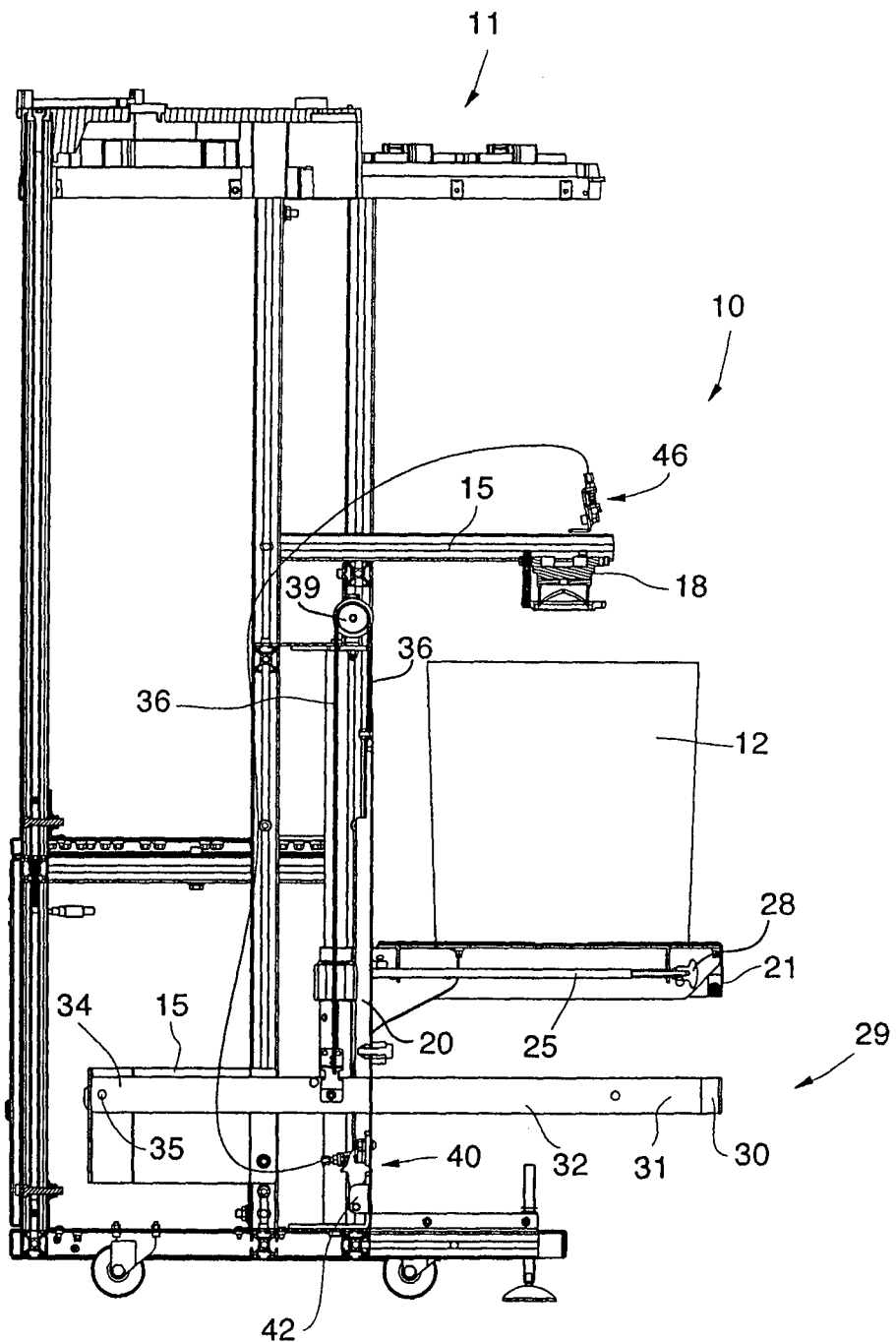
FIG. 3 is a lateral and schematized view of the perforation device in FIG. 1 in a first operating position.

With reference to FIGS. 1 and 2, a perforation device 10 according to the present invention is shown mounted on a machine 11 for preparing and dispensing coloring products, contained in closed containers 12, for example metal, one of which is shown, by way of example, in FIG. 3. The machine 11 can be of any known type, for example like the one described in the Italian patent of industrial invention n. 1.279.712, cited above, or any that might be developed in the future.

The perforation device 10 comprises a frame 15 (FIGS. 1 and 2), which is attached to a support structure 16 of the machine 11. A perforation member 18 is mounted on the frame 15 at a determinate height from the base. The perforation member 18 is also of the known type, for example with blades, shaped so as to perforate the upper part or lid of the receptacle 12, making a hole on it with a diameter suitable to allow the delivery of coloring products inside the receptacle 12. An example of how the perforation member 18 can be made is described in the Italian patent of industrial invention n. 1.279.712, cited above.

Figure 4:
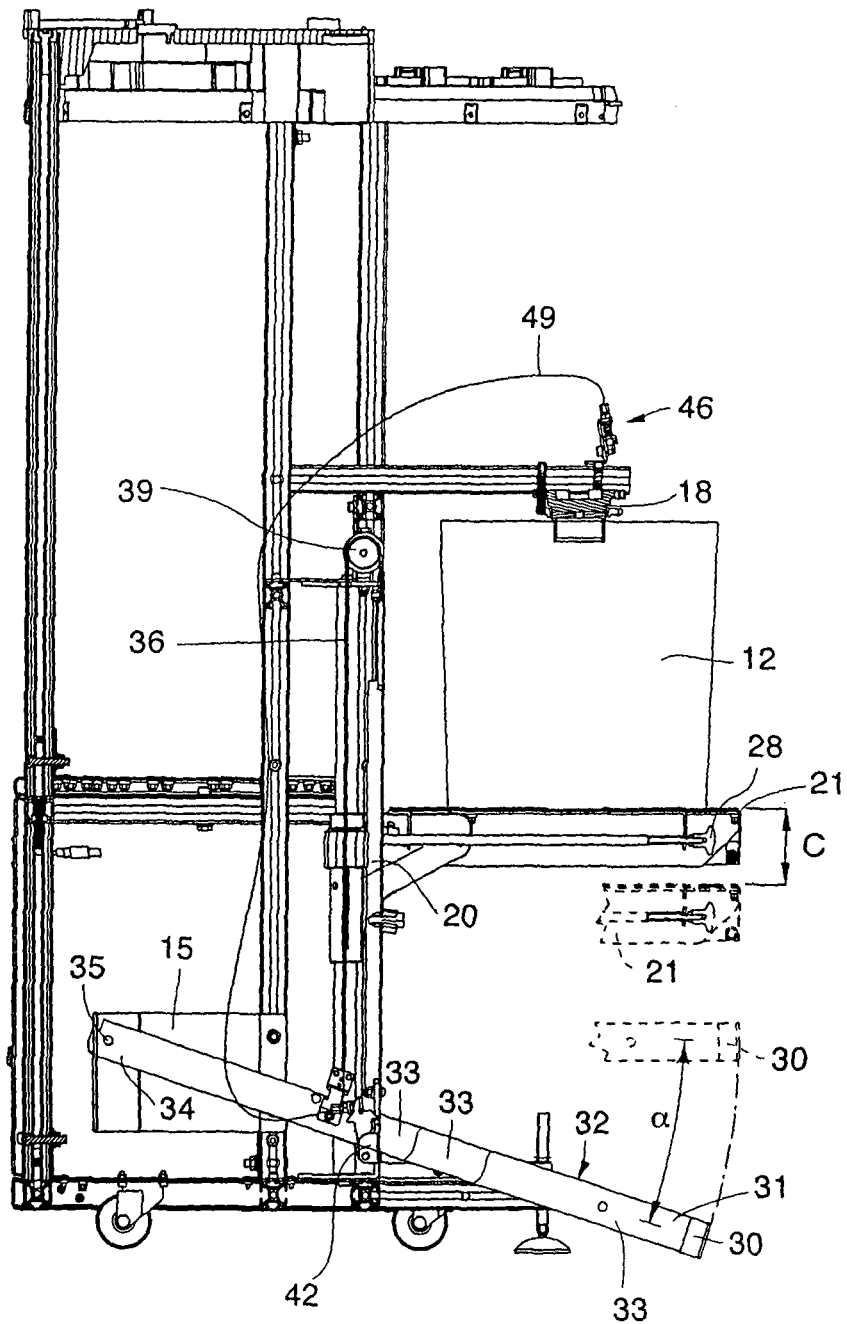
FIG. 4 is a lateral and schematized view of the perforation device in FIG. 1 in a second operating position.

A plate 20, for example metal, is mounted able to slide vertically with respect to the frame 15 and is mobile between a lower or inactive position, shown in FIGS. 1, 2 and 3, and an upper or punching position shown in FIG. 4. A support plane 21 is mounted cantilevered on the plate 20, on the upper surface of which support plane 21 a receptacle 12 is able to be positioned.

Figure 5:
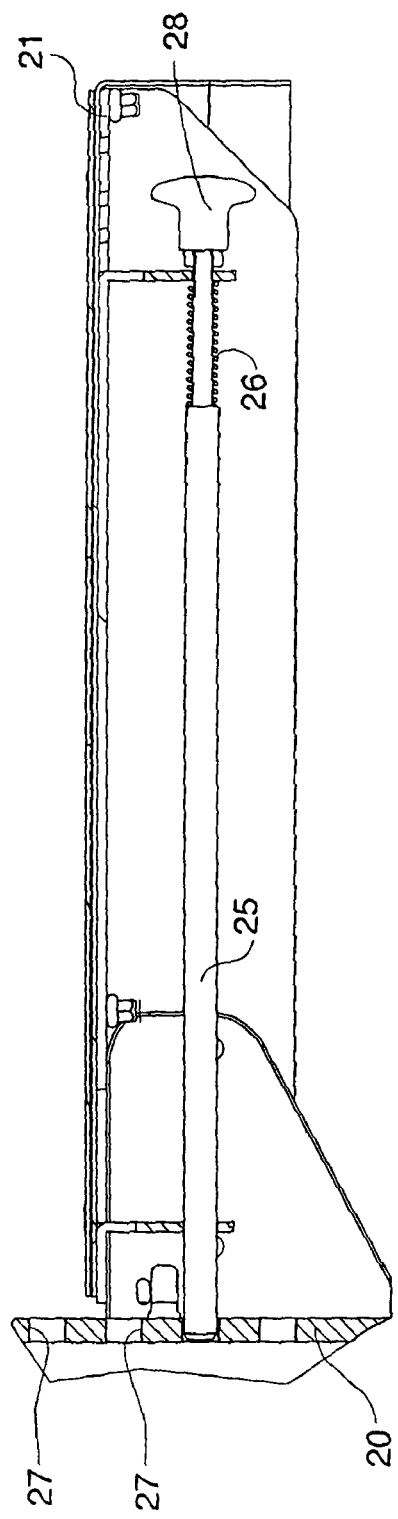
FIG. 5 is a lateral view of a first enlarged detail of the perforation device in FIG. 1.

The support plane 21 is mounted sliding vertically on two uprights 22 of the frame 15, distanced and lateral with respect to the plate 20, and can also be adjusted in height with respect to the latter, depending on the height of the receptacle 12 to be perforated. In fact, the support plane 21 is provided with a clamping peg 25 (FIG. 5) which is normally held by a helical spring 26 inside one of the holes of a first plurality of holes 27 in the plate 20 and aligned vertically (FIG. 1) substantially at the center thereof. The interaxis between two adjacent holes 27 is for example about 15 mm.

A knob 28 (FIGS. 1 to 5) is attached at the end of the clamping peg 25 opposite the end inserted in one of the holes 27 and is drivable manually to temporarily release the clamping peg 25, making it slide axially against the action of the helical spring 26. The support plane 21 can be raised or lowered manually and thus positioned at the desired height with respect to the plate 20, so that when the receptacle 12 to be perforated is positioned on the support plane 21, the upper part of the receptacle 12 is at a distance of about 10 mm to about 20 mm from the lower end of the perforation member 18.

The plate 20 and the support plane 21 associated therewith can be raised selectively toward the perforation member 18 by means of a lifting mechanism 29, which comprises a pedal 30 attached to an external end 31 of a lever 32 formed by two arms 33, parallel to each other, the lever 32 being pivoted with an internal end 34 to a pin 35 of the frame 15.

The two arms 33 of the lever 32 are inserted with play in two vertical slits 37 made in the lower part of the plate 20.

Figure 6:
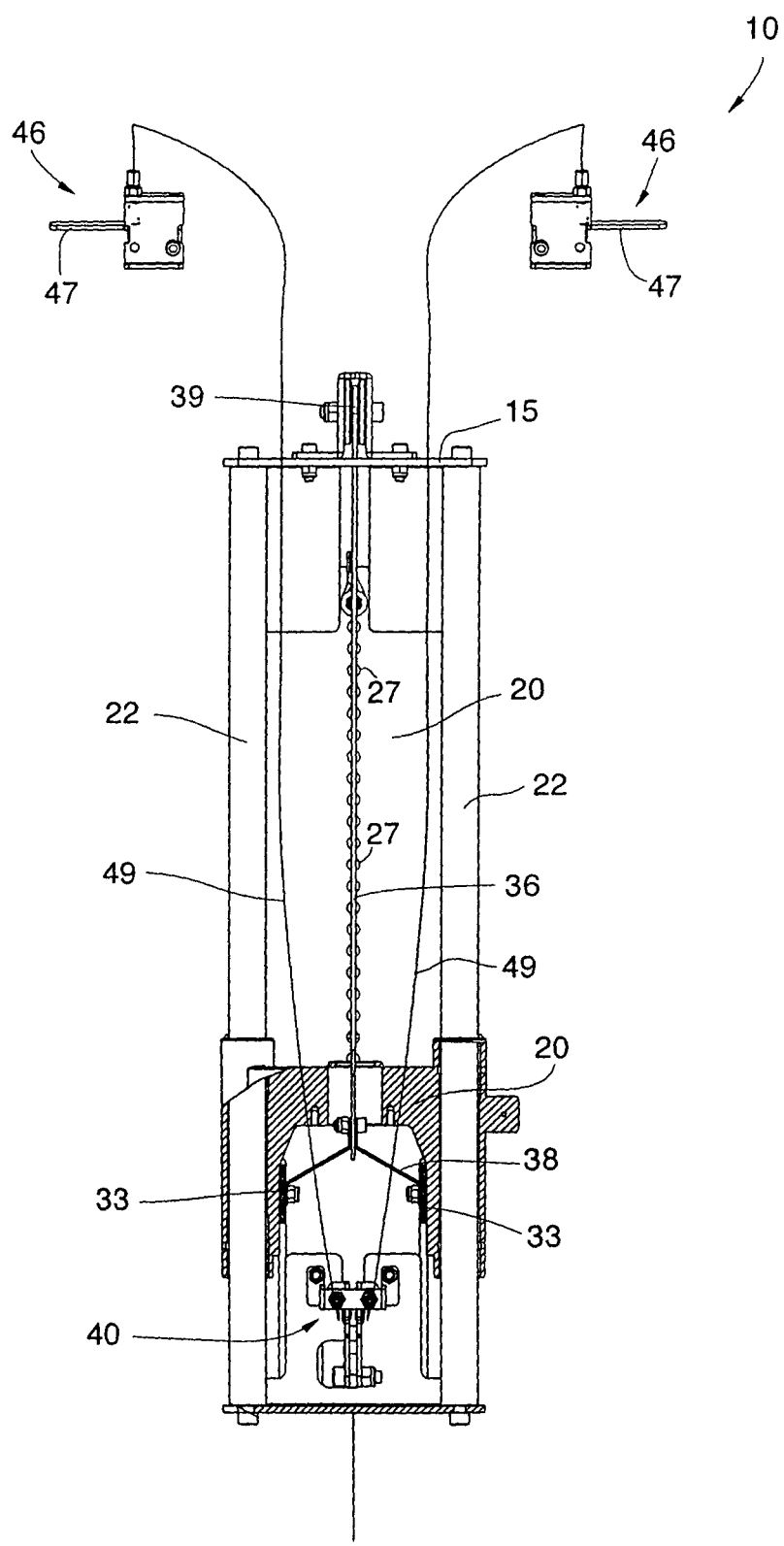
FIG. 6 is a back and partial view of the perforation device in FIG. 1.

One end of a cable 36, for example metal, is attached to the two arms 33 of the lever 32 in an intermediate point between the ends 31 and 34, behind the plate 20, by means of a fork 38 (FIG. 6). The opposite end of the cable 36 is attached in the upper part of the plate 20. The cable 36 passes on a fixed pulley 39 rotatably supported by the frame 15.

In the inactive condition, the lever 32 is substantially horizontal (FIGS. 1 to 4), held in said position at least by the weight of the plate 20 itself, or by a return spring not shown in the drawings, and of the support plane 21. Furthermore, in this position, the arms 33 of the lever 32 are disposed in the upper part of the slits 37 of the plate 20.

The perforation device 10 also comprises a safety mechanism 40, which in turn comprises two hooks 42 (FIGS. 2, 3, 4 and 8), pivoted in the lower part of the frame 15 and held constantly thrust by helical springs 43 inside corresponding holes 45 made in the lower part of the plate 20, between the slits 37. The holes 45 are disposed on two vertical rows, adjacent and distanced from each other by about 8 mm, and have a vertical interaxis of about 12 mm.

The two hooks 42 normally hold the plate 20 and the associated support plane 21 clamped in an inactive position; they must be released simultaneously to allow to drive the pedal 30 and to lift the support plane 21 toward the perforation member 18. To this purpose the safety mechanism 40 also comprises two actuation elements 46, able to be actuated manually and independently, to make the two hooks 42 rotate in an anti-clockwise direction (FIG. 8) and take them out of the corresponding holes 45 of the plate 20, against the action of the helical springs 43. In particular, each actuation element 46 comprises a button 47 disposed above the perforation member 18 and on opposite sides with respect to a vertical axis passing through the perforation member 18 and connected to the corresponding hook 42 by a connecting tie rod 49.

Figure 7:
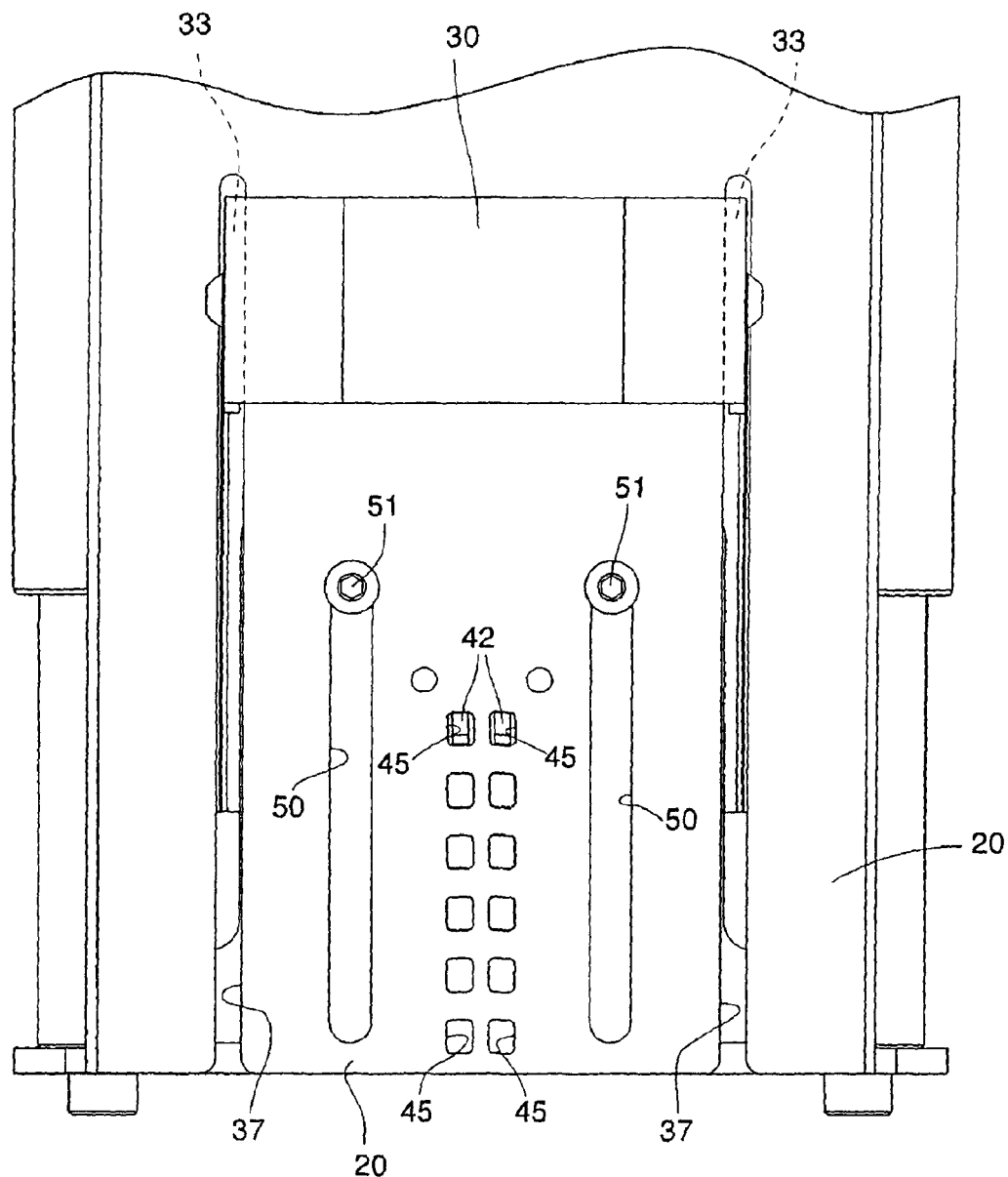
FIG. 7 is a front view of a second enlarged detail of the perforation device in FIG. 1.
Figure 8:
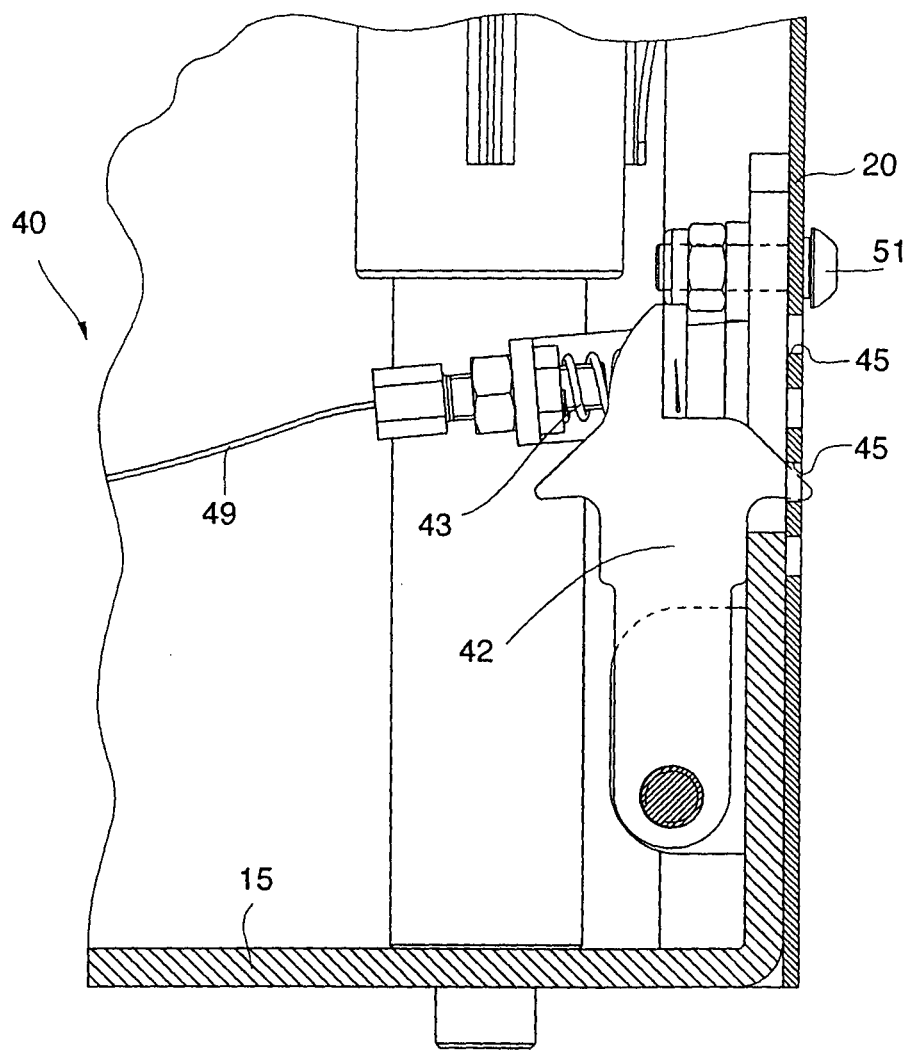
FIG. 8 is a lateral view of a third enlarged detail, partly sectioned, of the perforation device in FIG. 1.

To ensure the holes 45 correspond to the hooks 42, the lower part of the plate 20 is provided with two vertical eyelets 50 (FIG. 7) into which two corresponding fixed pegs 51 of the frame 15 are inserted.

The position of the two actuation elements 46 obliges the operator, for his safety and security, to drive the two buttons 47 with both hands, before lowering the pedal 30 with his foot and perform the operation to perforate the receptacle 12.

The perforation device 10 as described heretofore functions as follows.

First of all the operator has to vertically position the support plane 21 at the right height—which for example could be indicated by a luminous indicator—with respect to the plate 20, driving the knob 28 manually, depending on the height of the receptacle 12 to be perforated, so that, at rest, there are from about 10 mm to about 20 mm between the upper surface of the receptacle 12 and the lower end of the perforation member 18, as described above.

After having positioned the receptacle 12 on the support plane 21, the operator drives the two buttons 47 with both hands and presses with the foot the pedal 30, thus making the lever 32 rotate in a clockwise direction (FIG. 4) by an angle $\alpha$ of about 18°-20°. Consequently the cable 36 pulls the plate 20, the support plane 21 and the receptacle 12 upward, making them perform a travel C of about 60-80 mm, and the perforation member 18 perforates the receptacle 12 properly.

When the pedal 30 is released, the perforation device 10 automatically returns to the inactive position.

It should be noted that the two buttons 47 of the safety mechanism 40 must both be kept actuated until the perforation operation is completed, because if only one of the two were to be released, the corresponding helical spring 43 would return the associated hook 42 inside a hole 45, thus clamping the plate 20.

It is clear that modifications and/or additions of parts may be made to the perforation device 10 as described heretofore, without departing from the field and scope of the present invention.

It is also clear that, although the present invention has been described with reference to some specific examples, a person of skill in the art shall certainly be able to achieve many other equivalent forms of perforation device for perforating closed receptacles containing coloring products, having the characteristics as set forth in the claims and hence all coming within the field of protection defined thereby.

I claim:

1. A perforation device to perforate closed receptacles containing coloring products, comprising a support plane configured to support a receptacle to be perforated, wherein the support plane is movable in a substantially vertical direction, a perforation member positioned at a determinate height, higher than said support plane, and actuation means to selectively move said support plane toward said perforation member to cause the perforation of said receptacle to be perforated, wherein said actuation means comprise a lifting mechanism connected to said support plane and drivable by means of a pedal, wherein the perforation device also comprises a safety mechanism that is manually drivable in order to prevent said pedal from being driven by an operator without the operator also driving said safety mechanism at the same time and with both hands;

wherein said lifting mechanism comprises a cable having a first end connected to said pedal and a second end connected to said support plane, so that the actuation of said pedal causes the lifting of said support plane toward said perforation member;

wherein said support plane is mounted on a plate sliding vertically with respect to a frame and wherein said second end of said cable is fixed to said plate; and wherein said support plane can be positioned at different heights with respect to said plate using vertical positioning means in order to be selectively positioned, at rest, at a determinate distance from said perforation member, depending on a height of said receptacle to be perforated.

2. The device as in claim 1, wherein, in an intermediate zone between the first end and the second end of the cable, said cable is disposed on a pulley mounted in a fixed position on said frame.

3. The device as in claim 2, wherein said frame comprises two uprights disposed laterally and on opposite sides with respect to said plate and on which said support plane is able to slide vertically.

4. The device as in claim 1, wherein said frame comprises two uprights disposed laterally and on opposite sides with respect to said plate and on which said support plane is able to slide vertically.

5. The device as in claim 1, wherein said vertical positioning means comprise a first plurality of holes made on said plate and aligned vertically, with which a clamping peg mounted on said support plane is selectively engageable, and which can be selectively disengaged by means of a manually driven knob.

6. The device as in claim 1, wherein said safety mechanism comprises two hooks normally held attached to said plate by elastic means to hold said plate normally clamped in a lowered position, wherein each of said hooks is mechanically connected to an actuation element which can be actuated manually.

7. The device as in claim 6, wherein each actuation element comprises a button disposed above said perforation member and on opposite sides with respect to a vertical axis passing through said perforation member and connected to the corresponding hook by a connecting tie rod.

8. The device as in claim 7, wherein said elastic means are configured to hold said hooks inserted in corresponding second pluralities of holes made in the lower part of said plate.

9. The device as in claim 6, wherein said elastic means are configured to hold said hooks inserted in corresponding second pluralities of holes made in the lower part of said plate.

10. A perforation device to perforate closed receptacles containing coloring products, comprising a support plane configured to support a receptacle to be perforated, wherein the support plane is movable in a substantially vertical direction, a perforation member positioned at a determinate height, higher than said support plane, and actuation means to selectively move said support plane toward said perforation member to cause the perforation of said receptacle to be perforated, wherein said actuation means comprise a lifting mechanism connected to said support plane and drivable by means of a pedal, wherein the perforation device also comprises a safety mechanism that is manually drivable in order to prevent said pedal from being driven by an operator without the operator also driving said safety mechanism at the same time and with both hands;

wherein said safety mechanism comprises two hooks normally held attached to said plate by elastic means to hold said plate normally clamped in a lowered position, wherein each of said hooks is mechanically connected to an actuation element which can be actuated manually.

11. The perforation device of claim 10, wherein each actuation element comprises a button disposed above said perforation member and on opposite sides with respect to a vertical axis passing through said perforation member and connected to the corresponding hook by a connecting tie rod.

12. The device of claim 11, wherein said elastic means are suitable to hold said hooks inserted in corresponding second pluralities of holes made in the lower part of said plate.

13. The device as in claim 10, wherein said elastic means are suitable to hold said hooks inserted in corresponding second pluralities of holes made in the lower part of said plate.

* * * * *